Oct. 6, 1959    J. L. GIFFEN    2,907,566
ARTICLE FEEDING MECHANISM

Filed Jan. 17, 1955    3 Sheets-Sheet 1

INVENTOR
JAMES L. GIFFEN
BY Bates + Willard
ATTORNEYS

Oct. 6, 1959  J. L. GIFFEN  2,907,566
ARTICLE FEEDING MECHANISM
Filed Jan. 17, 1955  3 Sheets-Sheet 2
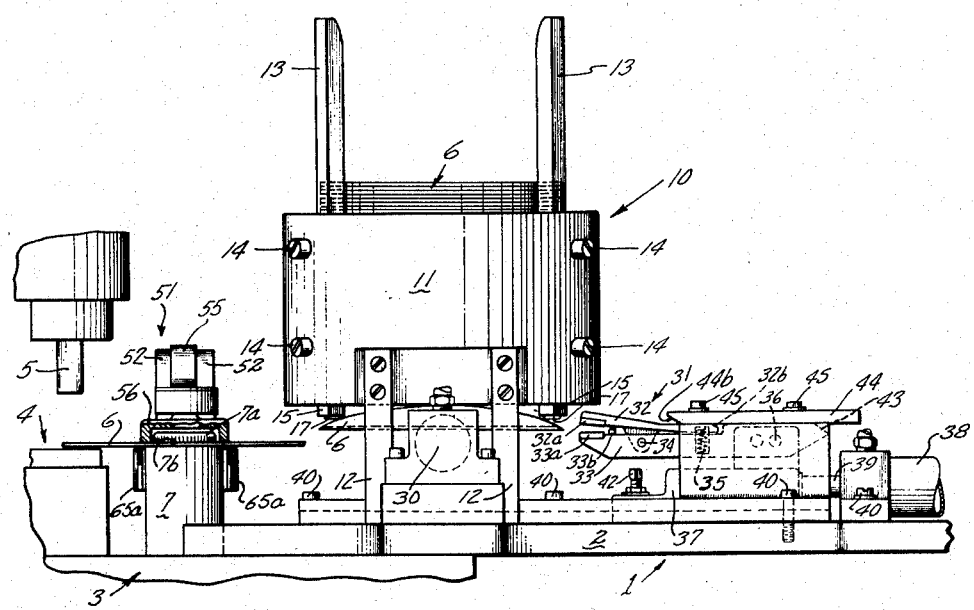
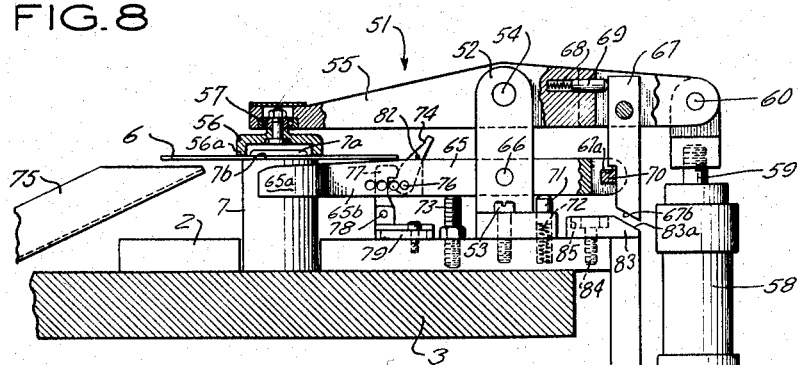
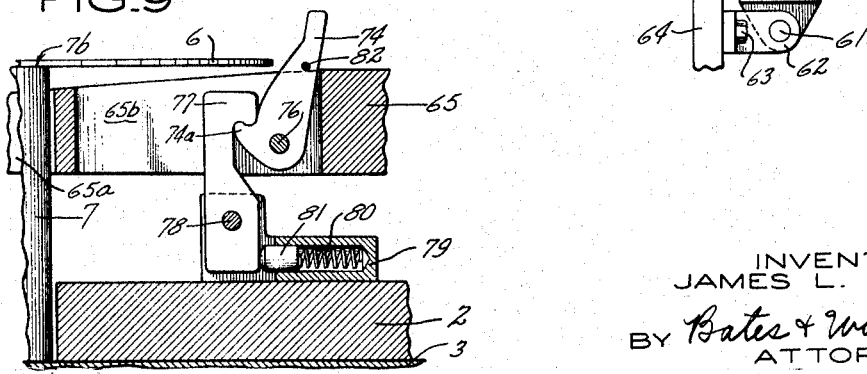
INVENTOR
JAMES L. GIFFEN
BY Bates & Willard
ATTORNEYS Oct. 6, 1959   J. L. GIFFEN   2,907,566
ARTICLE FEEDING MECHANISM
Filed Jan. 17, 1955   3 Sheets-Sheet 3
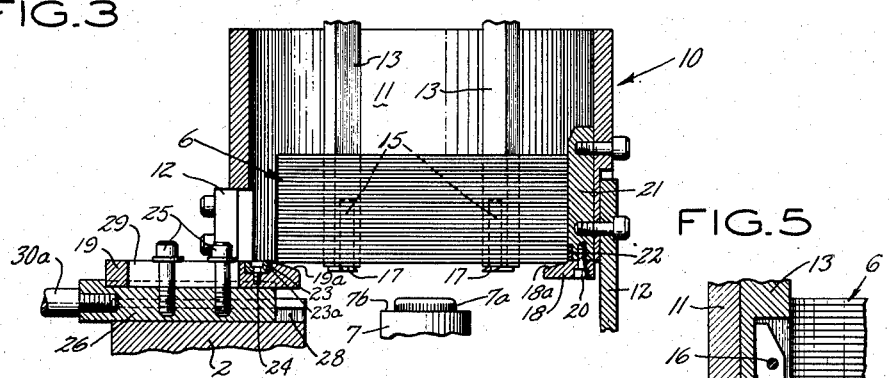
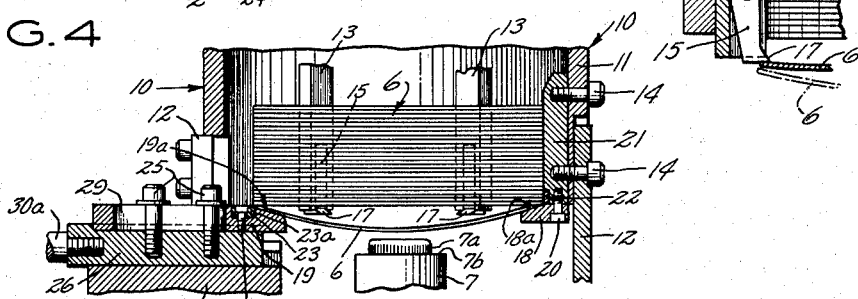
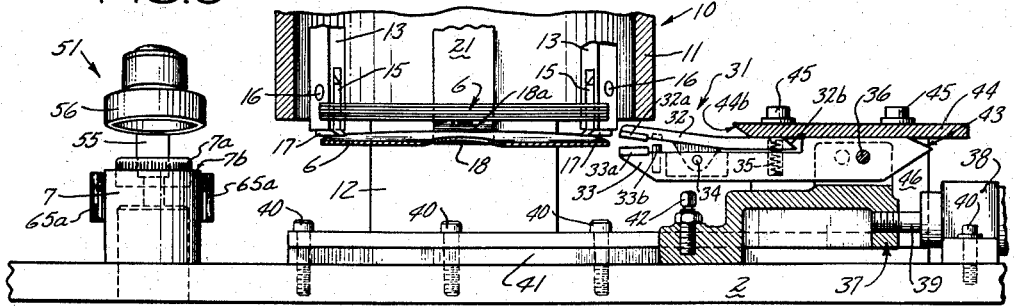
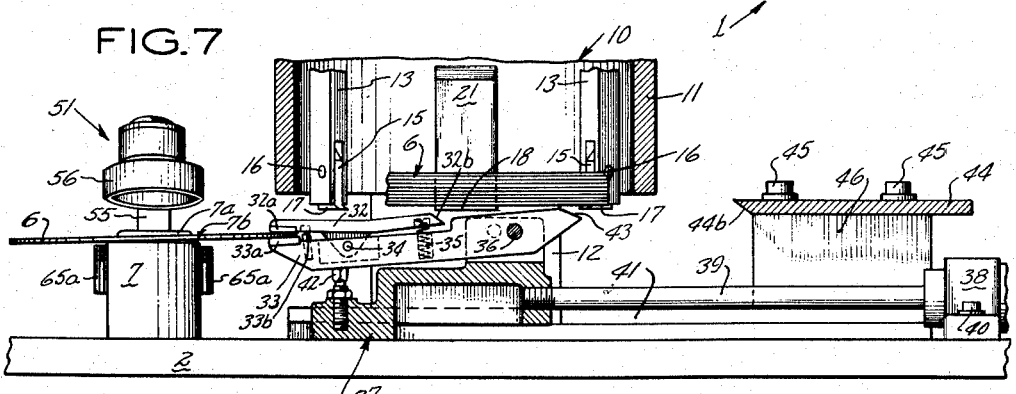
INVENTOR
JAMES L. GIFFEN
BY Bates + Willard
ATTORNEYS

United States Patent Office 2,907,566
Patented Oct. 6, 1959

2,907,566

ARTICLE FEEDING MECHANISM

James L. Giffen, Hudson, N.Y., assignor to Emhart Manufacturing Company, Hartford, Conn., a corporation of Delaware Application January 17, 1955, Serial No. 482,244

6 Claims. (Cl. 271—19)

The present invention relates to a machine for feeding and removing work pieces from a power press and more particularly to mechanism for feeding metal plates or the like successively and automatically to a notching press for peripheral notching to form electric motor laminations and other articles of a similar character.

Considerable time, effort and money has been spent in attempting to provide dependable mechanism of this character.

A main object of the invention is to provide a machine of the character described which operates consistently and without failure and which may be used either as an attachment to a power press or as an integral part of the press.

A further object is to provide mechanism for feeding work pieces successively from a magazine to a die and in which mechanism each work piece is individually and positively gripped and transferred independently of other work pieces in the supply magazine.

Another object is to provide a mechanism in which each work piece is gripped and held at the work station and discharged therefrom automatically following performance of press or dieing operations thereon.

The foregoing objects, features and advantages, and others which appear more fully hereinafter, are accomplished by the apparatus embodying the invention which is illustrated in the accompanying drawings, and in which:

Fig. 2 is a front elevation view of the apparatus of Fig. 1;

Fig. 3 is a cross-sectional view taken on line 3—3 of Fig. 1;

Fig. 4 is a view similar to Fig. 3 but with the lowermost plate convexly flexed in the supply magazine;

Fig. 5 is a fragmentary cross-sectional view taken on line 5—5 of Fig. 1 showing one of the several identical fingers for holding a plate flexed;

Fig. 6 is a cross-sectional view taken generally on line 6—6 of Fig. 1 showing a position of the transfer mechanism prior to gripping and transferring the flexed plate shown in the magazine;

Fig. 7 is a view similar to Fig. 6 showing a plate transferred onto a positioning arbor at the notching station of the press;

Fig. 8 is a cross-sectional view taken on line 8—8 of Fig. 1 showing details of hold-down and ejection mechanism for plates on the arbor; and Fig. 9 is an enlarged vertical cross-sectional view of the plate ejecting mechanism shown in Fig. 8.

Figure 1:
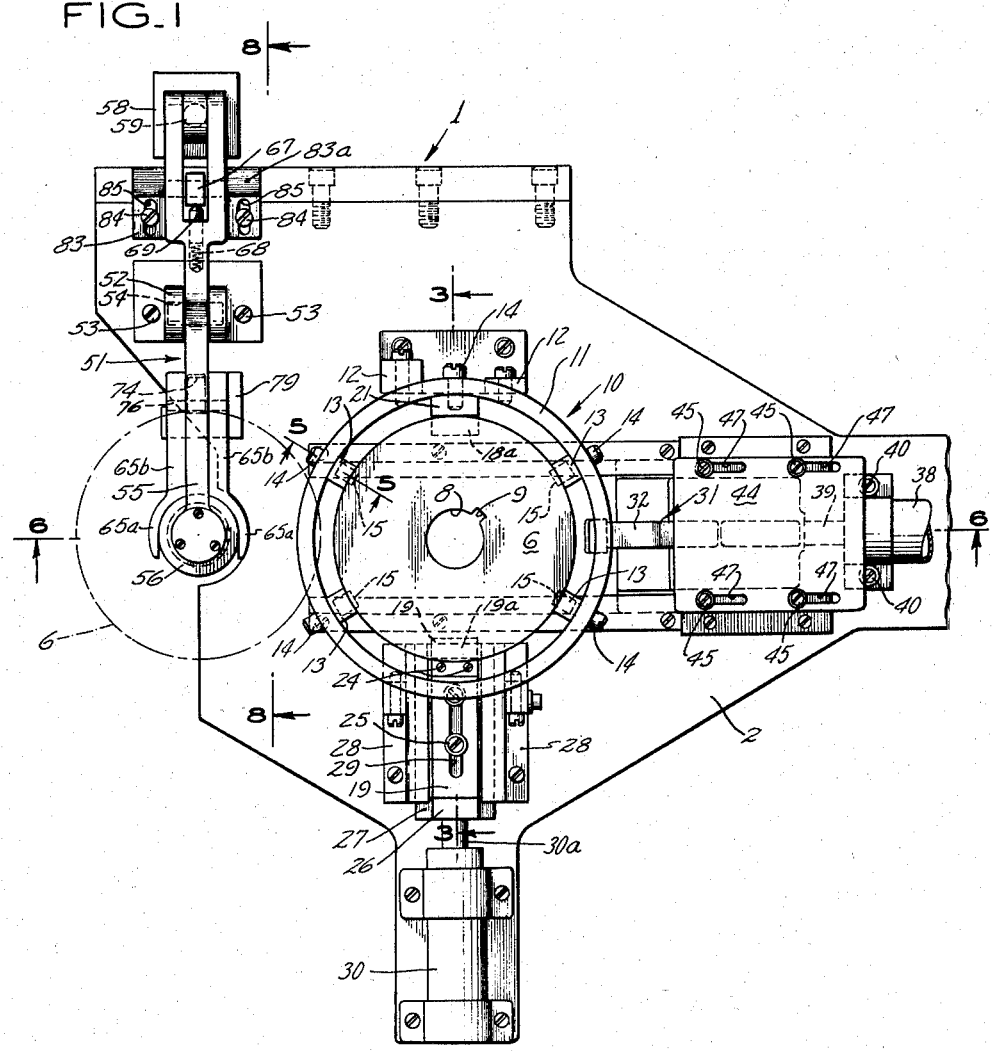
Figure 1 is a plan view of apparatus for feeding stacked circular plates individually from a supply magazine to the punching station of a press.

Referring to the drawings, the illustrated mechanism for transferring successive work pieces to the forming station of a press is shown mounted and supported directly upon the frame of the press as an integral part of the press mechanism. However, it is to be understood that the transferring mechanism, including frame work, may be provided as a separate machine unit which is adapted to be positioned adjacent a press and to have the operation of the transfer mechanism integrated and coordinated with that of the press.

The frame work of the machine, as shown in the drawings, is generally designated 1, and includes a horizontal bed plate 2 which is rigidly secured to the horizontal work table 3 of a power press which is generally designated 4. The press may include a notching die 5, or other suitable tool, for fashioning a work piece 6 at a forming station on an arbor 7 to which the work piece 6 is fed and on which the work piece is held during the die-forming operation and thereafter removed by the mechanism of the present invention.

The work pieces 6 shown in the drawings are generally flat circular plates or discs which are adapted to be assembled as electric motor laminations. It should be understood, however, that the particular work piece 6 which is shown is merely illustrative and that the invention is applicable to work pieces in a wide variety of shapes and sizes. The illustrated work piece 6 has a central circular aperture 8 which is adapted to fit snugly around the knurled position 7a and be supported by the annular shoulder portion 7b of the arbor 7 for the notching of the periphery of the work piece 6 with the die 5. The aperture 8 provides for subsequent assembly of the work piece on a shaft (not shown) to form a laminated motor rotor or the like. The aperture 8 preferably includes a notch 9 with which to key each of an assembly of the work pieces to a rotor shaft or the like.

A magazine or holder, generally designated 10, is provided for a stack of the work pieces or discs 6 from the bottom of which the discs are fed individually and successively to the arbor 7 for notching by the die 5.

Referring more particularly to Figs. 1-4, inclusive, the magazine 10 includes a vertically disposed cylindrical shell member 11 which is fastened to and supported by legs 12, the lower ends of which are fixed to the bed plate 2 of the frame. As shown in the drawings, four vertically disposed posts 13 are equally spaced about and secured to the inner wall of the cylinder 11, as by bolts 14, to snugly align the several discs 6 in a stack therein.

As shown in Fig. 5, an escapement detent or pawl 15 is pivotally suspended or hung, as at 16, in a recess in the foot of each of the posts 13 so that at least a part of a beveled foot portion 17 of each pawl 15 normally hangs suspended under the discs 6. Downward pressure of a plate 6 on a beveled foot portion 17 of the pawls 15 swings the pawls outwardly so that the plate 6 may move to a position beneath the pawls, as shown in Fig. 4, whereupon the pawls 15 swing inwardly to their normal position in which, as shown in Fig. 6, they overlie and are adapted to hold down the plate 6 and prevent the return of the plate to an unflexed position against the adjacent disc in the stack.

As shown in Fig. 3, the plate 6 at the bottom of the stack is supported by inwardly and downwardly beveled surfaces 18a and 19a of a pair of support shoes 18 and 19.

The support members 18 and 19 also cooperate to bend or flex the lowermost disc 6 downwardly, as shown in Fig. 4 by reciprocating one of the support shoes toward and away from the other. More particularly, the support 18 is secured, as by bolts 20, to a member 21 that is secured to the holder 11 by the bolts 14. Preferably a hardened insert 22 is provided in the member 21 against which the edge of the disc 6 resting on the beveled surface 18 is pressed by the member 19 to flex the disc 6 downwardly, as shown in Fig. 4.

The member 19 also is provided with a hardened insert 23 which is secured to the member 19 by screws 24. Preferably the inner or pressing surface 23a is inclined inwardly and upwardly substantially at right angles to the inclined disc supporting surface 19a. The insert 23 extends upwardly from the top of the surface 19a slightly less than the thickness of a disc 6 so that bending of the disc always is downwardly from the stack when the support 19 is moved inwardly as shown in Fig. 4.

In order to reciprocate the support shoe 19 between the positions shown in Figs. 3 and 4, the member 19 is secured as by bolts 25 to a slide 26 which in the illustrated device includes gibs 27 slidably secured by gib plates 28. The member 19 may be slotted as at 29 to provide for adjustment of the member 19 relative to the slide 26 by means of the bolts 25. Reciprocation of the slide 26 is effected by a piston motor 30 and its piston shaft 30a which is secured to the slide 26. Inward movement of the slide presses the lowermost disc 6 which rests on the members 18 and 19 between the inserts 22 and 23 and flexes the disc downwardly, as shown in Fig. 4, beneath the pawls 15. Thereafter the member 19 is retracted by the motor 30 and the edges of the disc 6 are relieved of the pressure from the inserts 22 and 23. However, as shown in Fig. 6, the pawls 15 engage and hold the disc 6 partially flexed on the supporting surfaces 18a and 19a so that an edge portion of the flexed disc 6, intermediate the portions supported by the members 18 and 19, is spaced downwardly from the bottom of the stack ready for gripping by a gripper, generally designated 31, with which the disc 6 is transferred to and deposited on the arbor 7 preparatory to fashioning the disc with the notching die 5 or other suitable tool.

Referring more particularly to Figs. 1 and 2 and 6 and 7, the gripper-transfer device 31 includes upper and lower jaw members 32 and 33 which are pivotally connected at 34. The adjacent forward ends of the jaws 32 and 33 preferably are provided with gripper plates 32a and 33a and are closed, as shown in Fig. 7, by a spring 35.

The lower jaw 33 is pivotally carried adjacent its rear end by a pin 36 which is horizontally disposed so that the jaws may be pivoted from an upper position (Fig. 6) at which the open jaw plates 32a and 33a are at the proper elevation for receiving the flexed disc 6 to a lower position (Fig. 7) at which the disc 6 is deposited on the arbor 7.

As shown in the drawings, the pin 36 is secured to a slide, generally designated 37, which is reciprocated between the positions shown in Figs. 6 and 7 by a piston motor 38, the shaft 39 of which is secured to the slide 37. It will be observed that the path of reciprocation of the support slide for the gripping jaws is generally normal to the path of reciprocation of the support shoe 19. The motor 38 is secured to the bed plate 2 by bolts 40 as are the gib plates 41 which provide a guide track for the slide 37.

Gravity pivots the jaw 33 downwardly to the position shown in Fig. 7 for depositing the disc 6 on the arbor 7. Preferably an adjustable stop 42 is provided on the slide 37 for selectively limiting the position to which the jaw 33 swings. Upon retraction of the slide 37 by the motor 38, a beveled camming surface 43 on the rear end of the jaw 33 is adapted to engage and be forced downwardly by a stationary cam plate 44 which is secured as by bolts 45 to a pair of supports 46 extending upwardly from the gib plate 41. The elevation of the cam plate 44 may be adjusted, as by shims (not shown), so that the jaws 32 and 33 are swung to the proper position shown in Fig. 6, to receive the disc 6 when the jaws are moved toward the arbor 7.

As shown in Fig. 1, the plate 44 may be slotted, as at 47, or otherwise adapted for adjustment in the direction of travel of the slide 37, so as to engage and disengage the jaw 33 at a selected position of travel between the positions shown in Figs. 6 and 7.

The cam plate 44 also acts to engage and open the jaw 32 relative to the jaw 33 against the force of the spring 35 as the slide 37 is retracted and further acts to release the jaw 32 so that the spring 35 closes the jaws on the disc 6 during the forward movement of the slide 37. Preferably as shown in the drawings, the forward edge of the cam plate 44 is beveled, as at 44b, and the rearward end of the upper jaw 32 is conformingly beveled, as at 32b, so that the opening and closing camming movement of the jaws 32 and 33 is effected gradually and smoothly as is the swinging of the lower jaw 33 on the pivot pin 36 between the upper and lower positions shown in Figs. 6 and 7.

As best seen in Fig. 8, mechanism generally designated 51 is provided for pressing the aperture 8 of the disc 6 firmly on the knurled portion 7a of the arbor 7 against the annular shoulder 7b. More particularly, the mechanism 51 includes a support 52 suitably fastened as by bolts 53 to the bed plate 2 and having a pivot pin 54 on which a rocker arm 55 is pivotally mounted.

The forward end of the arm 55 has an inverted cup-shaped pressing member 56, the rim 56a of which is adapted to press a disc 6 firmly onto the arbor post 7a and against the shoulder 7b. Preferably the cup member 56 is of a size to freely receive the arbor portion 7a when the rim 56a engages the disc 6. As shown in Fig. 8, contact of the rim 56a with the disc 6 preferably is adjacent the disc aperture 8 so as to lessen the tendency of the disc to bend or flex when forced onto the knurled arbor post 7a by the rim 56a.

The cup-shaped pressing member 56 is secured to the rocker arm 55 through a self-centering thrust bearing 57 which assures that the pressure exerted by the rocker arm 55 is uniformly applied by the pressing rim 56a to the disc 6.

The force for rocking the arm 55 to press on and remove a disc 6 from the arbor 7 is provided by a piston motor 58, the piston rod 59 of which is pivotally connected by a pin 60 to the rear end of the arm 55. As shown in Fig. 8, the housing of the motor 58 is pivotally secured at 61 to a bracket 62 fastened as by bolts 63 to a plate 64 welded or otherwise secured to the bed plate 2.

Removal of the disc 6 from the arbor 7 following notching of the disc by the die 5 of the dieing machine 4 is effected by the yoke-shaped end 65a of a rocker arm 65 which is pivoted at 66 on the support 52 beneath the pivot pin 54 for the upper rocker arm 55. As shown in Fig. 1, the yoke-shaped end 65a of the rocker arm 65 straddles and generally conforms to the arbor 7 so that upward pressure of the yoke cleanly strips the disc 6 from the arbor post 7a without binding or otherwise catching thereon.

The disc 6 is stripped from the arbor post 7a concurrently with the upward movement of the upper arm 55 which relieves the disc 6 of the pressure of the holddown member 56. More particularly, and as shown in Fig. 8, a latching pawl 67 pivotally hangs from the rocker arm 55 and is resiliently pressed by a spring 68 and pin 69 into engagement with a block 70 on the rear end of the rocker arm 65 when the rocker arm 55 holds the disc 6 on the arbor 7. A second pin 71 and spring 72 holds the rear end of the rocker arm 65 up and the yoke 65a down, as shown in Fig. 8, against the adjustable stop 73 in which position a shoulder portion 67a of the pawl 67 overlies the block 70. Retraction of the piston rod 59 by the motor 58 rocks the arm 55 and raises the disc holddown member 56. Substantially simultaneously, the pawl shoulder 67a engages and depresses the block 70 thereby swinging the rocker arm 65 so that the yoke-end 65a strips the disc 6 from the arbor post 7a.

As soon as the disc 6 clears the top of the arbor 7, a knock-out pawl 74 (Figs. 8 and 9), or other suitable knock-out member, is automatically actuated to drive the released disc 6 into a delivery chute 75.

As best shown in Figs. 1 and 9, the illustrated knock-out pawl 74 is pivoted at 76 between the spaced arm portions 65b of the rocker 65 and is provided with a crank arm or detent 74a which engages an overhanging stop 77 as the yoke 65a is raised and causes the pawl 74 to abruptly strike and knock the disc 6 into the chute 75. Preferably the stop 77 is pivoted as at 78 to a support 79 which is fastened to the bed-plate 2 and is provided with a spring 80 and pin 81 for holding the stop 77 in spring-pressed engagement with the pawl crank 74a. The pawl 74 also may be provided with a pin 82 which is engageable with the arms 65b to limit the forward swing of the pawl.

Further retraction of the piston rod 59 causes the sloping lower end 67b of the pawl 67 to engage and slide rearwardly on the corresponding sloping cam surface 83a of a stationary cam 83 thereby disengaging the pawl shoulder 67a and block 70 so that the spring 72 forces the rocker arm 65 back against the stop 73. The cam 83 preferably is adjustably secured on the bed plate 2 as by means of a bolt 84 in the cam slot 85 so that the pawl 67 releases the rocker arm 65 at a desired position in the movement of the rocker whereupon the knock-out pawl 74 may be returned by gravity, or by pressure from the next disc 6, which is moved onto the arbor 7 by the transfer mechanism 31, or by a spring (not shown) or any desired alternative to a position in which it rests against the arm 65, as shown in Fig. 9.

The operation of the machine is as follows:

A number of the discs 6 are stacked in the magazine 10 supported by the inclined surfaces 18a and 19a of the members 18 and 19, substantially as shown in Fig. 3. Preferably the notches 9 of the discs 6 in the magazine 10 are aligned and oriented at a selected position so that subsequent notching of the discs by the die 5 is effected at a desired angular relationship to the notch 9.

With the discs properly stacked, the motor 30 is actuated to advance the piston shaft 30a and the slide 29 so that the hardened inserts 22 and 23 cooperate to pinch and flex the lowermost disc in the stack to the position shown in Figs. 2 and 4. The weight of the stack of discs above the flexed disc, together with the angular inclination of the insert 23, cooperate to assure that the discs 6 always flex downwardly from the bottom of the stack. Following the flexing of the discs 6 downwardly to the position shown in Fig. 4, the pawls 15 swing back into the path of the disc so that the pawls 15 engage and hold the disc partially flexed, as shown in Figs. 5 and 6, when the slide 26 is retracted and the disc 6 relieved of the pinching engagement of the hardened inserts 22 and 23 by retraction of the piston rod 30a of the motor 30.

Thereafter the disc 6 is held partially flexed by the restraint of the pawls 15 and the cam surfaces 18a and 19a, ready for gripping by the clamping jaws 32a and 33a. Whereupon, the motor 38 is actuated to advance the slide 37 and the gripper jaws 32 and 33 carried thereby along a path of travel which is midway between the flexing members 18 and 19 and at right angles to the line therebetween. During the initial portion of forward travel of the jaws 32 and 33, the gripper plates 32a and 33a are open and receive therebetween the edge of the downwardly flexed disc. With further forward travel of the slide 37, the upper jaw 32 is relieved of the restraint of the cam plate 44 and closes on the disc 6 responsive to the spring 35. Further forward movement causes the closed jaws 32 and 33 to carry the disc 6 gripped therebetween to the arbor 7. It will be understood that the member 19 is sufficiently retracted so that the inserts 22 and 23 offer no frictional restraint to the transfer of the disc from between them. Preferably a stop 33b is provided against which the disc 6 abuts to prevent slippage of the disc between the jaw plates 32a and 33a as the disc is slid from between the supporting surfaces 18a and 19a and the pawls 15 which maintain flexing restraint on the disc. The disc when relieved of this restraint automatically springs back to the unflexed flat condition.

When the leading edge of the forwardly moving disc 6 overlies the knurled portion 7a of the arbor 7, the lower jaw 33 is relieved of the restraint of the cam plate 44 whereupon the jaw 33 swings so that the disc 6 is slidably supported on the top of the arbor 7 and further drops onto the knurled portion 7a, as shown in Fig. 7, when the disc aperture 8 moves into alignment.

Thereafter the slide 37 is retracted by the motor 38, the engagement of the knurled arbor post 7a with the disc aperture 8 acting to draw the disc 6 from between the jaw clamping plates 32a and 33a.

Either prior to or following removal of the disc 6 from the clamping jaws, the motor 58 may be operated to advance the piston rod 59 and pivot the rocker arm 55 so that the cup-shaped pressure foot 56 presses and firmly holds the disc 6 seated on the knurled post 7a against the shoulder 7b of the arbor 7, as shown in Fig. 8. At the same time, the spring 68 presses the pawl 67 against the block 70 attached to the lower rocker arm 65.

Following suitable forming operations performed on the secured disc 6 by the die 5, the motor 58 is operated to retract the piston rod 59 and swing the pressure foot 56 up and out of engagement with the disc 6 to the position shown in Figs. 6 and 7. Concurrently, the pawl shoulder 67a presses down on the block 70 and pivots the rocker arm 65 so that the yoke 65a strips the disc 6 from the arbor 7 and the stop 77 sharply pivots the knockout pawl 74 so as to strike and eject the disc 6 into the discharge chute 75. Thereafter the cam surface 83a of the cam 83 disengages the block 70 and pawl shoulder 67a and the spring 72 returns the stripper yoke 65a to the position shown in Figs. 2 and 8 in preparation for a repetition of the cycle.

It is to be understood that the described apparatus is illustrative of the invention and that modifications are contemplated and will be apparent to those skilled in the art which embody the invention and fall within the scope of the appended claims.

What I claim is:

1. A mechanism for separating a sheet blank from a stack thereof comprising a magazine in which the blanks are stacked, escapement means in said magazine permitting downward movement of the blanks but preventing upward movement thereof, and a pair of support shoes engaging opposite edge portions of the lowermost blank, one of the said shoes being reciprocable toward and away from the other to flex the lowermost blank downwardly past said escapement means while still supporting the said lowermost blank which is prevented by the said escapement means from resuming its position in the stack.

2. A mechanism for separating a sheet blank from a stack thereof comprising a magazine in which the blanks are stacked, a plurality of escapement pawls pivotally supported in said magazine in spaced relationship to permit downward movement of the blanks but to prevent upward movement thereof, and a pair of support shoes engaging opposite edge portions of the lowermost blank, one of said shoes being reciprocable toward and away from the other to flex the lowermost blank downwardly past said pawls while still supporting the said lowermost blank which is prevented by the pawls from resuming its position in the stack.

3. A mechanism for handling a succession of blanks which are to be operated on by a press or the like comprising a magazine in which the blanks are stacked, escapement means in said magazine permitting downward movement of the blanks but preventing upward movement thereof, a pair of support shoes engaging opposite edge portions of the lowermost blank, one of the said shoes being reciprocable toward and away from the other to flex the lowermost blank downwardly past said escapement means while still supporting the lowermost blank which is prevented by said escapement means from resuming its position in the stack, and means for removing the flexed blank from the stack comprising a pair of gripping jaws and a support for the jaws which is reciprocable in a path extending generally normal to the path of reciprocation of the said one support shoe to bring the gripping jaws into engagement with an edge portion of the flexed blank and to move the blank from between the support shoes, the said gripping jaws being adapted to close automatically when engaging the blank.

4. A mechanism for handling a succession of blanks which are to be operated on by a press or the like comprising a magazine in which the blanks are stacked, a plurality of escapement pawls pivotally supported in said magazine in spaced relationship to permit downward movement of the blanks but to prevent upward movement thereof, a pair of support shoes engaging opposite edge portions of the lowermost blank, one of the said shoes being reciprocable toward and away from the other to flex the lowermost blank downwardly past said pawls while still supporting the said lowermost blank which is prevented by the pawls from resuming its position in the stack, and means for removing the flexed blank from the stack comprising a pair of gripping jaws and a support for the shoes which is reciprocable in a path extending generally normal to the path of reciprocation of the said one support shoe to bring the gripping jaws into engagement with an edge portion of the flexed blank and to move the blank from between the support shoes, the said gripping jaws being adapted to close automatically while engaging the blank.

5. A mechanism for handling a succession of blanks which have an aperture therein and which are to be operated on by a press or the like comprising a magazine in which the blanks are stacked, escapement means in said magazine permitting downward movement of the blanks but preventing upward movement thereof, a pair of support shoes engaging opposite edge portions of the lowermost blank, one of the said shoes being reciprocable toward and away from the other to flex the lowermost blank downwardly past said escapement means while still supporting the lowermost blank which is prevented by said escapement means from resuming its position in the stack, means for moving the flexed blank to a position for operation comprising a pair of gripping jaws and a support for the jaws which is reciprocable in a path extending generally normal to the path of reciprocation of the said one support shoe to bring the gripping jaws into engagement with an edge portion of the flexed blank and to move the blank from between the support shoes to the said position for operation, the said gripping jaws being adapted to close automatically while engaging the blank, and an arbor arranged to extend through the aperture in each blank placed in the said position for operation, the said arbor retaining the blank so that the gripping jaws are stripped from the blank during movement of the gripping jaw support.

6. A mechanism for handling a succession of blanks which have an aperture therein and which are to be operated on by a press or the like comprising a magazine in which the blanks are stacked, a plurality of escapement pawls pivotally supported in said magazine in spaced relationship to permit downward movement of the blanks but to prevent upward movement thereof, a pair of support shoes engaging opposite edge portions of the lowermost blank, one of the said shoes being reciprocable toward and away from the other to flex the lowermost blank downwardly past the said escapement pawls while still supporting the lowermost blank which is prevented by said escapement pawls from resuming its position in the stack, means for moving the flexed blank to a position for operation comprising a pair of gripping jaws and a support for the jaws which is reciprocable in a path extending generally normal to the path of reciprocation of the said one support shoe to bring the gripping jaws into engagement with an edge portion of the flexed blank and to move the blank from between the support shoes to the said position for operation, the said gripping jaws being adapted to close automatically while engaging the blank, and an arbor arranged to extend through the aperture in each blank placed in the said position for operation, the said arbor retaining the blank so that the gripping jaws are stripped from the blank during movement of the gripping jaw support.

References Cited in the file of this patent

UNITED STATES PATENTS

| | | |
|---|---|---|
| 871,746 | Wright | Nov. 19, 1907 |
| 963,170 | Parker | July 5, 1910 |
| 1,086,700 | Clark | Feb. 10, 1914 |
| 1,151,429 | Alemany | Aug. 24, 1915 |
| 1,805,336 | Kowal | May 12, 1931 |
| 1,916,966 | Cunningham | July 4, 1933 |
| 2,010,567 | Schwamb et al. | Aug. 6, 1935 |
| 2,298,683 | Dalton | Oct. 13, 1942 |
| 2,413,553 | Evers | Dec. 31, 1946 |
| 2,551,476 | Vantlander | May 1, 1951 |
| 2,641,321 | Cruzon | June 9, 1953 |